US012769006B2

(12) United States Patent
Konishi et al.

(10) Patent No.: US 12,769,006 B2
(45) Date of Patent: Oct. 20, 2026

(54) OBJECT DETECTION APPARATUS

(71) Applicant: Honda Motor Co., Ltd., Tokyo (JP)

(72) Inventors: Shunsuke Konishi, Wako (JP); Ryota Okutsu, Tokyo (JP); Shuhei Masuoka, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 265 days.

(21) Appl. No.: 18/887,142

(22) Filed: Sep. 17, 2024

(65) Prior Publication Data

US 2026/0086238 A1 Mar. 26, 2026

(51) Int. Cl.

*G01S 17/931* (2020.01)
*G01S 17/89* (2020.01)
*G06V 20/58* (2022.01)

(52) U.S. Cl.

CPC ............ *G01S 17/931* (2020.01); *G01S 17/89* (2013.01); *G06V 20/58* (2022.01); *G06V 2201/07* (2022.01)

(58) Field of Classification Search

CPC ........ G01S 17/931; G01S 17/89; G01S 17/58; G01S 7/4808; G06V 20/58; G06V 2201/07

USPC ........................................................ 356/4.01

See application file for complete search history.

(56) References Cited

U.S. PATENT DOCUMENTS

2010/0303248 A1* 12/2010 Tawada .................... G01H 7/00 381/56
2012/0026034 A1* 2/2012 Shiomi .................. G01S 19/42 342/357.25
2017/0097412 A1 4/2017 Liu et al.
2017/0371033 A1 12/2017 Hamada
2018/0356505 A1 12/2018 Miyata
2021/0141092 A1 5/2021 Chen et al.
(Continued)

FOREIGN PATENT DOCUMENTS

JP 2017067756 A 4/2017
JP 2017116445 A 6/2017
(Continued)

OTHER PUBLICATIONS

Japanese office action; Application 2023-158609; 9 pages; Aug. 4, 2026.

*Primary Examiner* — Md M Rahman
(74) *Attorney, Agent, or Firm* — Duft & Bornsen, PC

(57) ABSTRACT

An object detection apparatus includes: a detector configured to irradiate with an electromagnetic wave to detect an exterior environment situation in the surrounding of a mobile body based on a reflected wave; and a microprocessor configured to perform: acquiring point cloud data from the detector; classifying the point cloud data into moving point cloud data and stationary point cloud data, the moving point cloud data corresponding to measurement points where absolute values of an absolute moving speeds are equal to or higher than a predetermined speed; converting the three-dimensional position information of measurement points corresponding to the moving point cloud data into two-dimensional position information; generating speed added data by adding the absolute moving speed corresponding to the measurement points to the two-dimensional position information; and detecting an object included in the surroundings of the mobile body, based on the speed added data.

8 Claims, 6 Drawing Sheets

(56) References Cited

U.S. PATENT DOCUMENTS

| | | | |
|---|---|---|---|
| 2022/0270375 | A1 | 8/2022 | Kurotobi et al. |
| 2024/0264310 | A1 | 8/2024 | Hisada et al. |
| 2024/0369700 | A1 | 11/2024 | Tong et al. |

FOREIGN PATENT DOCUMENTS

| | | | |
|---|---|---|---|
| JP | 2017227529 | A | 12/2017 |
| JP | 2019003235 | A | 1/2019 |
| JP | 2021188922 | A | 12/2021 |
| JP | 007126633 | B2 | 8/2022 |
| JP | 2023034318 | A | 3/2023 |
| WO | 2021038267 | A1 | 3/2021 |
| WO | 2023062862 | A1 | 4/2023 |

* cited by examiner

OBJECT DETECTION APPARATUS

CROSS-REFERENCE TO RELATED APPLICATION

This application is based upon and claims the benefit of priority from Japanese Patent Application No. 2023-158609 filed on Sep. 22, 2023, the content of which is incorporated herein by reference.

BACKGROUND

Technical Field

The present invention relates to an object detection apparatus configured to detect an object in the surroundings of a vehicle.

Related Art

As this type of device, a device that detects a moving object, by using three-dimensional point cloud data that has been acquired by a LiDAR, is known (see, for example, Japanese Patent No. 7126633).

As the device described in Japanese Patent No. 7126633, however, in a case where the point cloud data is used without change for detection processing of the moving object, it is likely to increase a calculation load in the detection processing.

SUMMARY

An aspect of the present invention is an object detection apparatus comprising:

a detector mounted on a mobile body, and configured to irradiate a three-dimensional space in a surrounding of a mobile body with an electromagnetic wave to detect an exterior environment situation in the surrounding of the mobile body based on a reflected wave; and a microprocessor. The microprocessor is configured to perform: acquiring from the detector, point cloud data including three-dimensional position information of a measurement point on a surface of an object from which the reflected wave is obtained and first speed information indicating a relative moving speed of the measurement point; acquiring second speed information indicating an absolute moving speed of the mobile body; calculating the absolute moving speed of each of a plurality of measurement points corresponding to the point cloud data, based on the first speed information and the second speed information; classifying the point cloud data into moving point cloud data and stationary point cloud data other than the moving point cloud data, the moving point cloud data corresponding to measurement points where absolute values of the absolute moving speeds are equal to or higher than a predetermined speed; converting the three-dimensional position information of each of measurement points corresponding to the moving point cloud data into two-dimensional position information; generating speed added data by adding the absolute moving speed corresponding to each of the measurement points corresponding to the moving point cloud data to the two-dimensional position information of each of the measurement points; and detecting the object included in the three-dimensional space in the surroundings of the mobile body, based on the speed added data.

BRIEF DESCRIPTION OF DRAWINGS

The objects, features, and advantages of the present invention will become clearer from the following description of embodiments in relation to the attached drawings, in which.

DETAILED DESCRIPTION

Hereinafter, embodiments of the present invention will be described with reference to the drawings. An object detection apparatus according to an embodiment of the present invention is applicable to a vehicle having a self-driving capability, that is, a self-driving vehicle. Note that a vehicle to which the object detection apparatus according to the present embodiment is applied will be referred to as a subject vehicle to be distinguished from other vehicles, in some cases. The subject vehicle may be any of an engine vehicle having an internal combustion (engine) as a traveling drive source, an electric vehicle having a traveling motor as the traveling drive source, and a hybrid vehicle having an engine and a traveling motor as the traveling drive source. The subject vehicle is capable of traveling not only in a self-drive mode that does not necessitate the driver's driving operation but also in a manual drive mode of the driver's driving operation.

While a self-driving vehicle is moving in the self-drive mode (hereinafter, referred to as self-driving or autonomous driving), such a self-driving vehicle recognizes an exterior environment situation in the surroundings of the subject vehicle, based on detection data of an in-vehicle detector such as a camera or a light detection and ranging (LiDAR). The self-driving vehicle generates a driving path (a target path) at a predetermined time elapsed after the current time, based on a recognition result, and controls an actuator for driving so that the subject vehicle travels along the target path.

Figure 1:
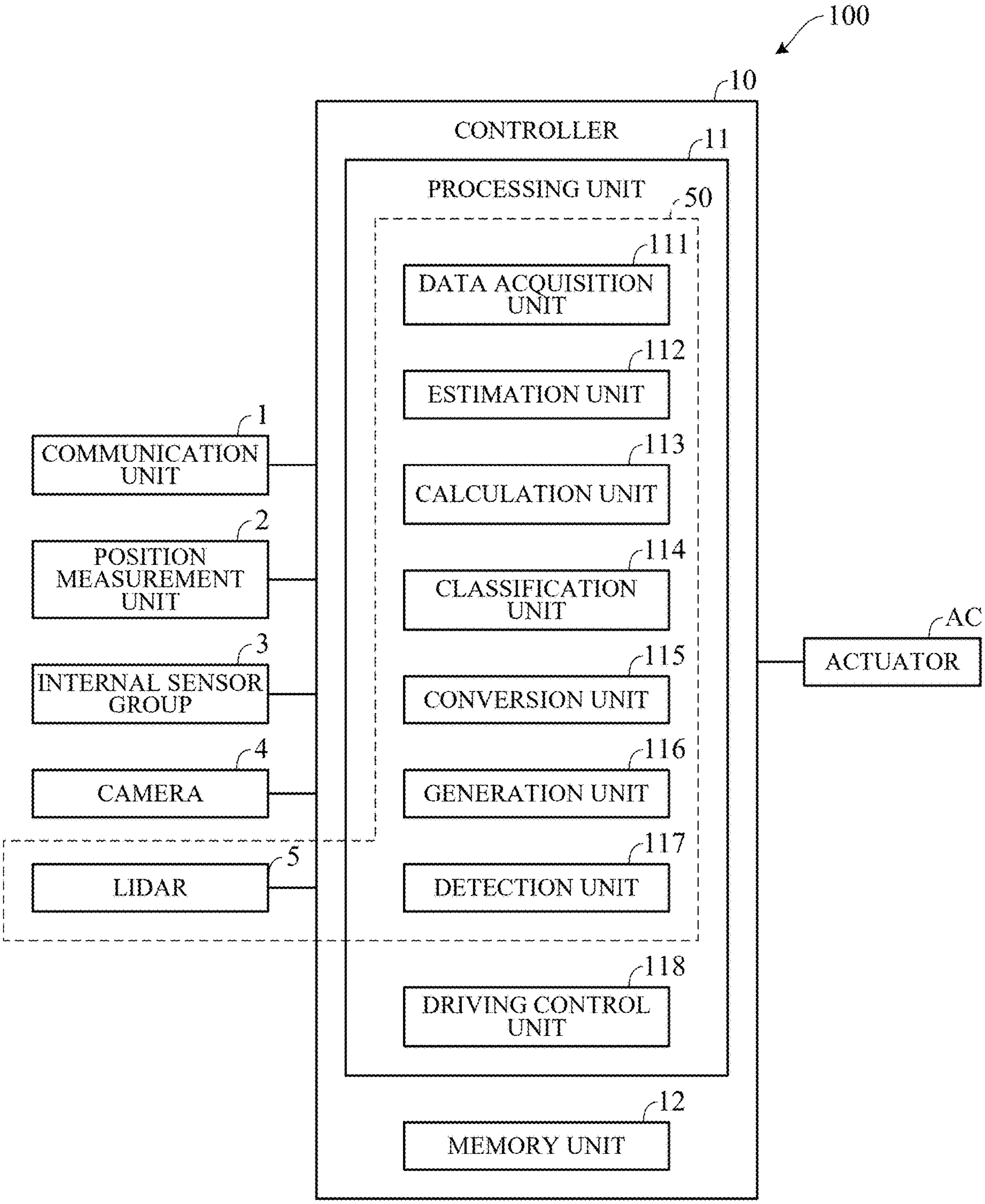
FIG. 1 is a block diagram illustrating a configuration of a substantial part of a vehicle control apparatus including an object detection apparatus according to the embodiment of the present invention.

FIG. 1 is a block diagram illustrating a configuration of a substantial part of a vehicle control apparatus 100 including the object detection apparatus. The vehicle control apparatus 100 includes a controller 10, a communication unit 1, a position measurement unit 2, an internal sensor group 3, a camera 4, a LiDAR 5, and a traveling actuator AC. In addition, the vehicle control apparatus 100 includes an object detection apparatus 50, which constitutes a part of the vehicle control apparatus 100. The object detection apparatus 50 detects an object in the surroundings of a vehicle, based on detection data of the LiDAR 5.

The communication unit 1 communicates with various servers, not illustrated, through a network including a wireless communication network represented by the Internet network, a mobile telephone network, or the like, and acquires map information, traveling history information, traffic information, and the like from the servers regularly or at a given timing. The network includes not only a public wireless communication network but also a closed communication network provided for every predetermined management area, for example, a wireless LAN, Wi-Fi (registered trademark), Bluetooth (registered trademark), and the like. The acquired map information is output to a memory unit 12, and the map information is updated. The position measurement unit (GNSS unit) 2 includes a position measurement sensor for receiving a position measurement signal transmitted from a position measurement satellite. The positioning satellite is an artificial satellite such as a GPS satellite or a quasi-zenith satellite. By using the position measurement information that has been received by the position measurement sensor, the position measurement unit 2 measures a current position (latitude, longitude, and altitude) of the subject vehicle.

The internal sensor group 3 is a generic term for a plurality of sensors (internal sensors) that detect a traveling state of the subject vehicle. For example, the internal sensor group 3 includes a vehicle speed sensor that detects the vehicle speed of the subject vehicle, an acceleration sensor that detects the acceleration in a front-rear direction and the acceleration (lateral acceleration) in a left-right direction of the subject vehicle, a rotation speed sensor that detects the rotation speed of the traveling drive source, a yaw rate sensor that detects the rotation angular speed around the vertical axis of the center of gravity of the subject vehicle, and the like. The internal sensor group 3 also includes sensors that detect a driver's driving operation in the manual drive mode, for example, an operation on an accelerator pedal, an operation on a brake pedal, an operation on a steering wheel, and the like.

The camera 4 includes an imaging element such as a CCD or a CMOS, and captures an image of the surroundings of the subject vehicle (a forward side, a rearward side, and lateral sides). The LiDAR 5 irradiates a three-dimensional space in the surroundings of the subject vehicle with an electromagnetic wave (a reflected wave), and detects an exterior environment situation in the surroundings of the subject vehicle, based on the reflected wave. More specifically, the electromagnetic wave (a laser beam or the like) that has been irradiated from the LiDAR 5 is reflected on and returned from a certain point (a measurement point) on the surface of an object, and thus the distance from the laser source to such a point, the intensity of the electromagnetic wave that has been reflected and returned, the relative speed of the object located at the measurement point, and the like are measured. The electromagnetic wave of the LiDAR 5, which is attached to a predetermined position (a front part) of the subject vehicle is scanned in a horizontal direction and a vertical direction with respect to the surroundings (a forward side) of the subject vehicle. Thus, the position, the shape, the relative moving speed, and the like of an object (a moving object such as another vehicle or a stationary object such as a road surface or a structure) on a forward side of the subject vehicle are detected. A target object detected by the LiDAR 5 will be referred to as an object including a person. Therefore, a moving object includes a moving person (a pedestrian or the like), in addition to a moving vehicle such as an automobile or a bicycle. Note that hereinafter, the above three-dimensional space will be represented by an X axis along an advancing direction of the subject vehicle, a Y axis along a vehicle width direction of the subject vehicle, and a Z axis along a height direction of the subject vehicle. Therefore, the above three-dimensional space will be referred to as an XYZ space, in some cases.

The actuator AC is a traveling actuator for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the actuators AC includes the traveling motor. The actuator AC also includes a brake actuator that operates a braking device of the subject vehicle and a steering actuator that drives the steering device.

The controller 10 includes an electronic control unit (ECU). More specifically, the controller 10 is configured to include a computer including a processing unit 11 such as a CPU (microprocessor), the memory unit 12 such as a ROM and a RAM, and other peripheral circuits (not illustrated) such as an I/O interface. Note that a plurality of ECUs having different functions such as an engine control ECU, a traveling motor control ECU, and a braking device ECU can be separately provided, but in FIG. 1, the controller 10 is illustrated as an aggregation of these ECUs as a matter of convenience.

The memory unit 12 stores highly precise detailed map information (referred to as high-precision map information). The high-precision map information includes position information of roads, information of road shapes (curvatures or the like), information of road gradients, position information of intersections and branch points, information of the number of traffic lanes (traveling lanes), information of traffic lane widths and position information for every traffic lane (information of center positions of traffic lanes or boundary lines of traffic lane positions), position information of landmarks (traffic lights, traffic signs, buildings, and the like) as marks on a map, and information of road surface profiles such as irregularities of road surfaces. In addition, the memory unit 12 stores programs for various types of control, information such as a threshold for use in a program, and setting information for the in-vehicle detection unit such as the LiDAR 5.

The processing unit 11 includes, as a functional configuration, a data acquisition unit 111, an estimation unit 112, a calculation unit 113, a classification unit 114, a conversion unit 115, a generation unit 116, an object detection unit (hereinafter, simply referred to as a detection unit) 117, and a driving control unit 118. Note that as illustrated in FIG. 1, the data acquisition unit 111, the estimation unit 112, the calculation unit 113, the classification unit 114, the conversion unit 115, the generation unit 116, and the detection unit 117 are included in the object detection apparatus 50. Details of the data acquisition unit 111, the estimation unit 112, the calculation unit 113, the classification unit 114, the conversion unit 115, the generation unit 116, and the detection unit 117 included in the object detection apparatus 50 will be described later.

In the self-drive mode, the driving control unit 118 generates a target path, based on an exterior environment situation in the surroundings of the vehicle, including a size, a position, a relative moving speed, and the like of an object that has been detected by the object detection apparatus 50. Specifically, the driving control unit 118 generates the target path to avoid collision or contact with the object or to follow the object, based on the size, the position, the relative moving speed, and the like of the object that has been detected by the object detection apparatus 50. The driving control unit 118 controls the actuator AC so that the subject vehicle travels along the target path. Specifically, the driving control unit 118 controls the actuator AC along the target path to adjust an accelerator opening or to actuate a braking device or a steering device. Note that in the manual drive mode, the driving control unit 118 controls the actuator AC in accordance with a traveling command (a steering operation or the like) from the driver that has been acquired by the internal sensor group 3.

Details of the object detection apparatus 50 will be described. As described above, the object detection apparatus 50 includes the data acquisition unit 111, the estimation unit 112, the calculation unit 113, the classification unit 114, the conversion unit 115, the generation unit 116, and the detection unit 117. The object detection apparatus 50 further includes the LiDAR 5.

The data acquisition unit 111 acquires, as detection data of the LiDAR 5, four-dimensional data (hereinafter, referred to as point cloud data) including position information indicating three-dimensional position coordinates of a measurement point on a surface of the object from which the reflected wave of the LiDAR 5 is obtained, and speed information indicating a relative moving speed of the measurement point. The point cloud data is acquired by the LiDAR 5 in units of frames, specifically, at a predetermined time interval (a time interval determined by a frame rate of the LiDAR 5).

The estimation unit 112 estimates an absolute moving speed (a speed vector in X, Y, Z coordinates) of the subject vehicle, based on the point cloud data that has been acquired by the data acquisition unit 111. Here, estimation of the absolute moving speed of the subject vehicle by the estimation unit 112 will be described.

First, the estimation unit 112 extracts point cloud data obtained by removing information of measurement points corresponding to a three-dimensional object from the point cloud data that has been acquired by the data acquisition unit 111, that is, point cloud data corresponding to a road surface (hereinafter, referred to as road surface point cloud data) in the surroundings of the subject vehicle. The estimation unit 112 calculates, in the following equation (i), a unit vector ei indicating the direction of a relative moving speed vi, based on the road surface point cloud data, that is, position coordinates (xi, yi, zi) included in four-dimensional data (xi, yi, zi, vi) of the measurement points Pi (i=1, 2, . . . , n) corresponding to the road surface.

$$e_i = \frac{(x_i, y_i, z_i)}{\|x_i, y_i, z_i\|} = (x_{ei}, y_{ei}, z_{ei}) \quad \text{Equation (i)}$$

Next, the estimation unit 112 estimates the moving speed (the absolute moving speed) Vself of the subject vehicle. Specifically, the estimation unit 112 sets a conversion formula for converting the relative moving speed vi of the measurement point Pi corresponding to the road surface into the absolute moving speed, as an objective function L, and solves an optimization problem for optimizing the objective function L to be closer to zero. The measurement point Pi is a measurement point on a road surface, and thus the absolute speed of each measurement point must be zero. Therefore, by optimizing the objective function L to be closer to zero, it becomes possible to estimate Vself that is correct. Vself is represented by speed components in XYZ-axis directions as indicated in the following equation (ii). The objective function L is expressed by the following equation (iii). By solving the above optimization problem, Vself that makes the right side of equation (iii) zero is searched for. Note that zero may be set to Vself as an initial value, or Vself that has been estimated in a previous frame may be set.

$$V_{self} = (v_x, v_y, v_z) \quad \text{Equation (ii)}$$

$$L(V, f(A, V_{self})) = V + A \cdot V_{self}^T \quad \text{Equation (iii)}$$

In the equation (iii), A denotes a matrix of unit vectors ei of n measurement points corresponding to the road surface, and is expressed by a equation (iv). In addition, in the equation (iii), V denotes a matrix of 1×n representing speed components (the relative moving speeds) of n measurement points Pi corresponding to the road surface, and is expressed by a equation (v). The estimation unit 112 acquires Vself obtained by solving the above optimization problem, as an estimated value of the absolute moving speed of the subject vehicle in a current frame.

$$A = [e_1, e_2, \ldots, e_n]^T = \begin{bmatrix} x_{e1} & y_{e1} & z_{e1} \\ x_{e2} & y_{e2} & z_{e2} \\ \vdots & \vdots & \vdots \\ x_{en} & y_{en} & z_{en} \end{bmatrix} \quad \text{Equation (iv)}$$

$$V = [v_1, v_2, \ldots, v_n]^T \quad \text{Equation (v)}$$

The calculation unit 113 calculates the absolute moving speeds of all measurement points, more specifically, all measurement points including the measurement points corresponding to the three-dimensional object, based on the absolute moving speed Vself of the subject vehicle that has been estimated by the estimation unit 112. Here, the absolute moving speed that has been calculated has a negative value when approaching the subject vehicle, and has a positive value when leaving the subject vehicle.

The classification unit 114 classifies the point cloud data that has been acquired by the data acquisition unit 111 into moving point cloud data corresponding to the measurement point at which the absolute value of the absolute moving speed that has been calculated by the calculation unit 113 is equal to or higher than a predetermined speed Th_V and stationary point cloud data corresponding to the measurement point at which the absolute value is lower than the predetermined speed Th_V.

Figure 2A:
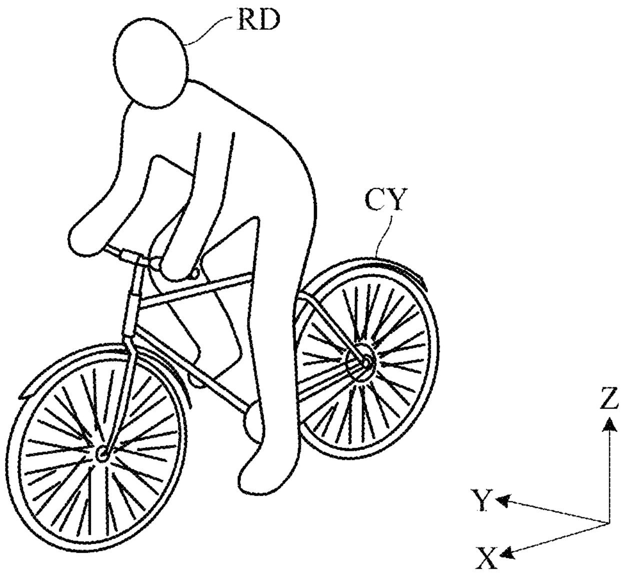
FIG. 2A is a diagram illustrating an example of a three-dimensional object included in a three-dimensional space in the surroundings of the subject vehicle.
Figure 2B:
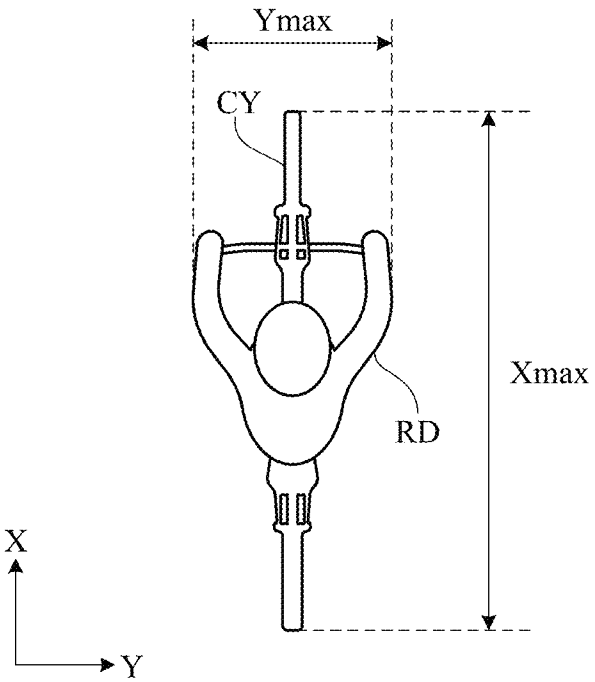
FIG. 2B is a plan view of the moving object in FIG. 2A.

FIGS. 2A and 2B are diagrams illustrating an example of a three-dimensional object included in a three-dimensional space in the surroundings of the subject vehicle. FIG. 2A illustrates a moving object (a bicycle CY and a person RD riding on the bicycle CY) traveling on a forward side of the subject vehicle in an advancing direction (X direction) of the subject vehicle. FIG. 2B illustrates a plan view of the moving object in FIG. 2A when viewed from above (Z direction). As illustrated in FIG. 2B, the maximum sizes (Xmax and Ymax) in XY directions of the three-dimensional object are recognizable without information of the height direction (Z direction) of the three-dimensional object. Then, the conversion unit 115 projects each measurement point on a plane to remove information of the height direction from the position information of each measurement point corresponding to the moving point cloud data, and converts the position information of each measurement point described above from three dimension to two dimension. Specifically, in a case where the position coordinates of each measurement point described above are represented in an XYZ coordinate system, the conversion unit 115 projects each measurement point corresponding to the moving point cloud data on the XY plane, and converts the moving point cloud data into two-dimensional data represented in an XY coordinate system.

The generation unit 116 adds the absolute moving speed that has been calculated by the calculation unit 113 to the moving point cloud data that has been changed into the two-dimensional data, and generates three-dimensional data (hereinafter, referred to as XYV data or speed added data). More specifically, the generation unit 116 adds the absolute moving speed corresponding to each measurement point to each piece of the position information of each measurement point included in the moving point cloud data that has been converted by the conversion unit 115 into two dimension.

The detection unit 117 detects a moving object in the surroundings of the subject vehicle, based on the XYV data that has been generated by the generation unit 116. More specifically, the detection unit 117 performs clustering processing on the XYV data, and detects a bounding box, which is a circumscribed region of the moving object, from the XY plane. Note that any method such as density-based spatial clustering of applications with noise (DBSCAN) or K-means clustering may be used for the clustering processing. The detection unit 117 further detects the position and the size of the moving object in a three-dimensional space (XYZ space), based on the position and the size of the circumscribed region that has been detected. The detection unit 117 outputs information (image information or the like) indicating a detection result of the moving object on a display device, not illustrated, or the like.

Figure 3A:
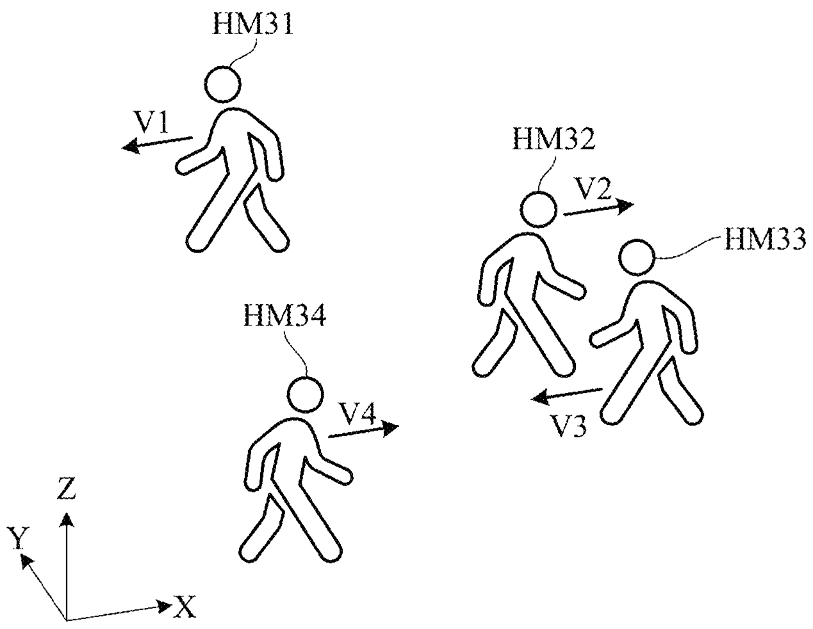
FIG. 3A is a diagram illustrating a situation in which a plurality of pedestrians are walking and passing each other.

Here, the detection accuracy of the moving object by the detection unit 117 will be described. FIG. 3A is a diagram illustrating a situation in which a plurality of pedestrians are walking and passing each other. FIG. 3A illustrates a situation in which pedestrians HM32 and HM34 are moving (walking) in the same direction (X-axis direction), and pedestrians HM31 and HM33 are moving (walking) in the direction opposite to it. Note that the absolute values of absolute moving speeds V1, V2, V3, and V4 of the pedestrians HM31, HM32, HM33, and HM34 are equal to or higher than a predetermined speed Th_V.

Figure 3B:
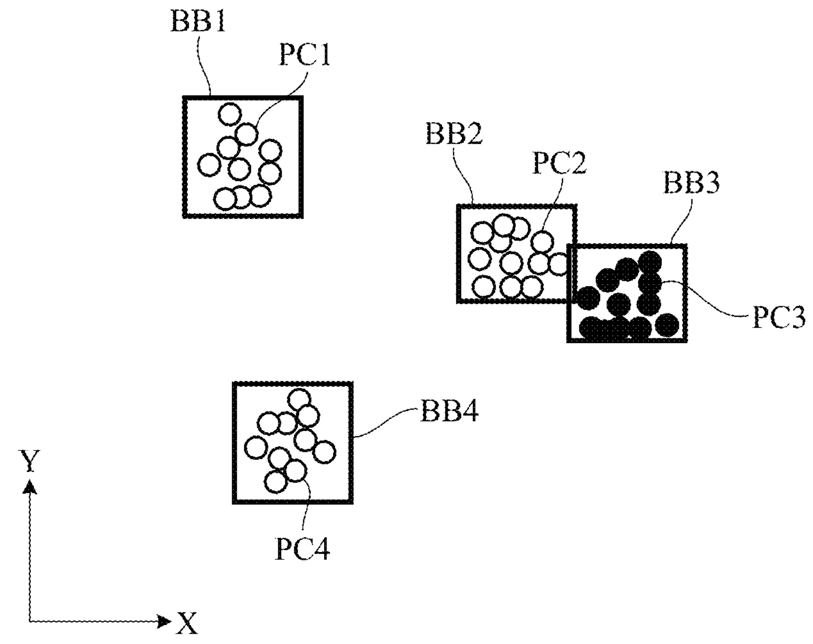
FIG. 3B is a diagram illustrating an example of three-dimensional data generated by the generation unit.

FIG. 3B is a diagram illustrating an example of three-dimensional data (XYV data) generated by the generation unit 116. FIG. 3B illustrates XYV data obtained by adding the absolute moving speeds V1 to V4 of the pedestrians HM31 to HM34 to two-dimensional data obtained by projecting, on the XY plane, measurement point clouds (clusters) PC1 to PC4, which respectively correspond to the pedestrians HM31 to HM34 in FIG. 3A. In FIG. 3B, the measurement point cloud of each pedestrian is drawn in a color in accordance with the absolute moving speed of each pedestrian. Note that in order to simplify the description, it is assumed that the absolute moving speeds V1, V2, and V4 of the pedestrians HM31, HM32, and HM34 are equal to one another. Therefore, in FIG. 3B, the measurement point clouds PC1, PC2, and PC4, which respectively correspond to the pedestrians HM31, HM32, and HM34, are drawn in the same color (white), and the measurement point cloud PC3, which corresponds to the pedestrian HM33, is drawn in a different color (black).

In addition, FIG. 3B illustrates bounding boxes BB1 to BB4, which respectively correspond to the measurement point clouds PC1 to PC4, and which have been detected by performing the clustering processing on the XYV data. In the example illustrated in FIG. 3B, because the measurement point clouds PC2 and PC3 are in close proximity to each other, there is a possibility that the measurement point clouds PC2 and PC3 are recognized as one measurement point cloud in the clustering processing, and are included in one bounding box. That is, there is a possibility that the pedestrian HM32 and the pedestrian HM33 are detected as an integrated object (as one pedestrian). However, the speed information is considered in the classification of the measurement points in the clustering processing as described above. Thus, the pedestrians HM32 and HM33, who are moving at different absolute moving speeds from each other, are detected as different moving objects, even though they are in close proximity to each other. As a result, as illustrated in FIG. 3B, the bounding boxes BB2 and BB3 are respectively allocated to the measurement point clouds PC2 and PC3, which respectively correspond to the pedestrians HM32 and HM33.

Figure 4A:
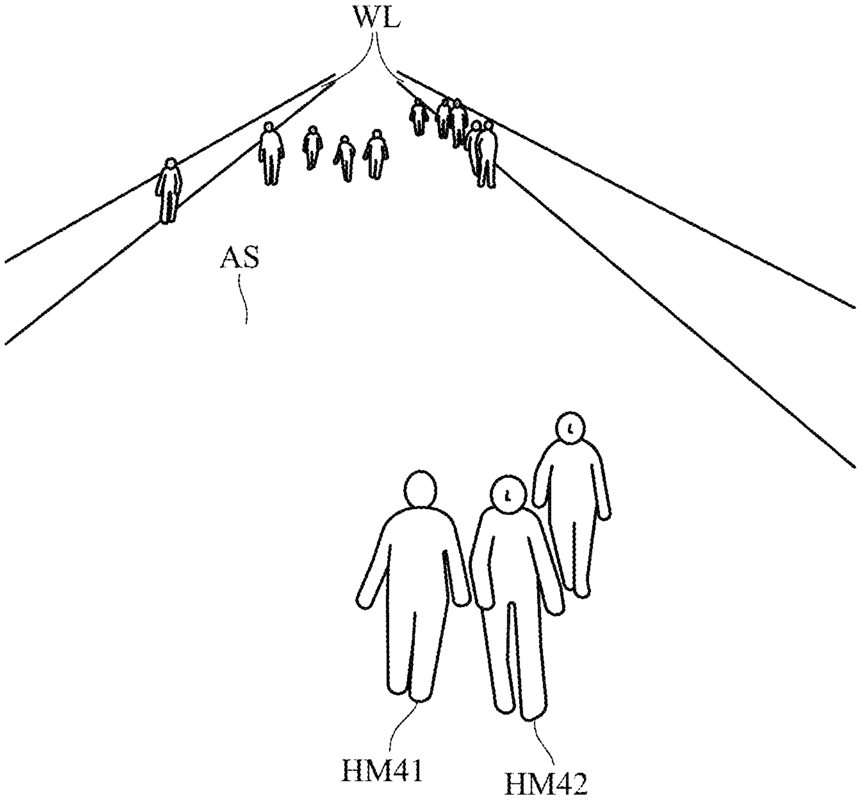
FIG. 4A is a diagram illustrating an example of a three-dimensional space viewed from the viewpoint of a LiDAR.
Figure 4B:
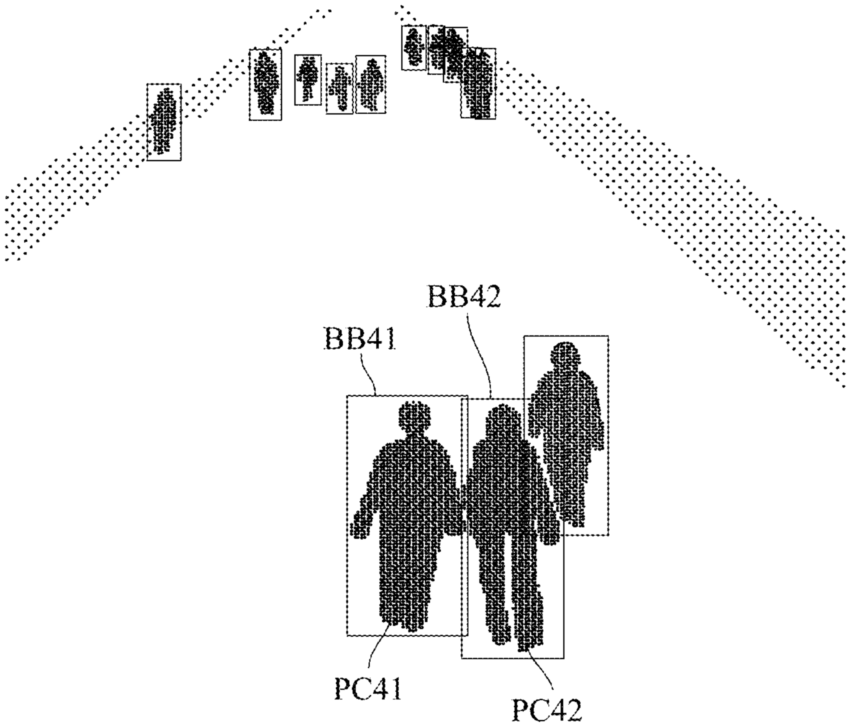
FIG. 4B is a diagram illustrating an example of an image indicating a detection result of the moving object.

FIGS. 4A and 4B are diagrams for describing a detection result of the moving object by the detection unit 117. Here, the detection result of the moving object by the detection unit 117 will be described with an example of detection data of a LiDAR installed in a concourse inside a commercial facility as illustrated in FIG. 4A, instead of the detection data of the LiDAR mounted on the vehicle. FIG. 4A illustrates a situation in a concourse AS inside the commercial facility when viewed from the viewpoint of the LiDAR. As illustrated in FIG. 4A, when lots of pedestrians are present in the concourse AS, the pedestrians get closer to each other. Hence, a plurality of pedestrians who are in close proximity to each other may be detected as an integrated object (as one pedestrian). However, by performing, by the detection unit 117, the clustering processing in consideration of the speed information as described above, even in a case where the detection data of the LiDAR includes moving objects that are moving and coming into close proximity to each other, it becomes possible to accurately detect the bounding box corresponding to each moving object.

FIG. 4B illustrates an example of the detection result of the moving object by the detection unit 117 with respect to a three-dimensional space of FIG. 4A. A lightly shaded region in FIG. 4B represents a measurement point cloud corresponding to a stationary object (walls WL of the concourse AS in FIG. 4A). A heavily shaded region represents a measurement point cloud corresponding to a moving object (a pedestrian moving in the concourse AS in FIG. 4A). A square frame represents a bounding box corresponding to each moving object (a pedestrian) that has been detected in the clustering processing by the detection unit 117. Note that FIG. 4B illustrates an image in which the bounding box corresponding to each moving object is superimposed on the detection data (the point cloud data) of the LiDAR. However, the detection unit 117 may output, as a detection result of the moving object, an image in which the bounding box corresponding to each moving object is superimposed on a captured image of the camera 4, instead of the point cloud data. In FIG. 4A, a pedestrian HM42 who is moving toward a near side in the concourse AS and a pedestrian HM41 who is moving toward a far side on its lateral side are in close proximity to each other. However, their moving speeds are different from each other, and thus they are detected as different moving objects by the detection unit 117. As a result, bounding boxes BB41 and BB42, which respectively correspond to the pedestrians HM41 and HM42, are displayed in the detection result of FIG. 4B. A plurality of pedestrians in close proximity to each other are also present on a right far side of the concourse AS. However, these pedestrians are similarly detected as different moving objects by the detection unit 117, and thus bounding boxes respectively corresponding to the pedestrians are displayed in the detection result of FIG. 4B. In this manner, according to the above clustering processing by the detection unit 117, even in a case where the detection data of the LiDAR 5 includes lots of moving objects that are in close proximity to each other, it becomes possible to accurately detect each moving object as a different moving object.

Depending on the type of the moving object, by the way, the absolute moving speed of a main body of the moving object may be different from the absolute moving speed of a part attached to the main body. For example, pedestrians move while moving four limbs. Thus, the absolute moving speeds of the torso and the four limbs of a moving pedestrian to be calculated by the calculation unit 113 are different from each other in some cases. In such cases, when the clustering processing is performed in consideration of the speed information as described above, the torso and the four limbs of the pedestrian may be detected as separate moving objects. Hence, in order to deal with such a problem, the detection unit 117 performs connection processing of a moving object, as will be described below.

Figure 5A:
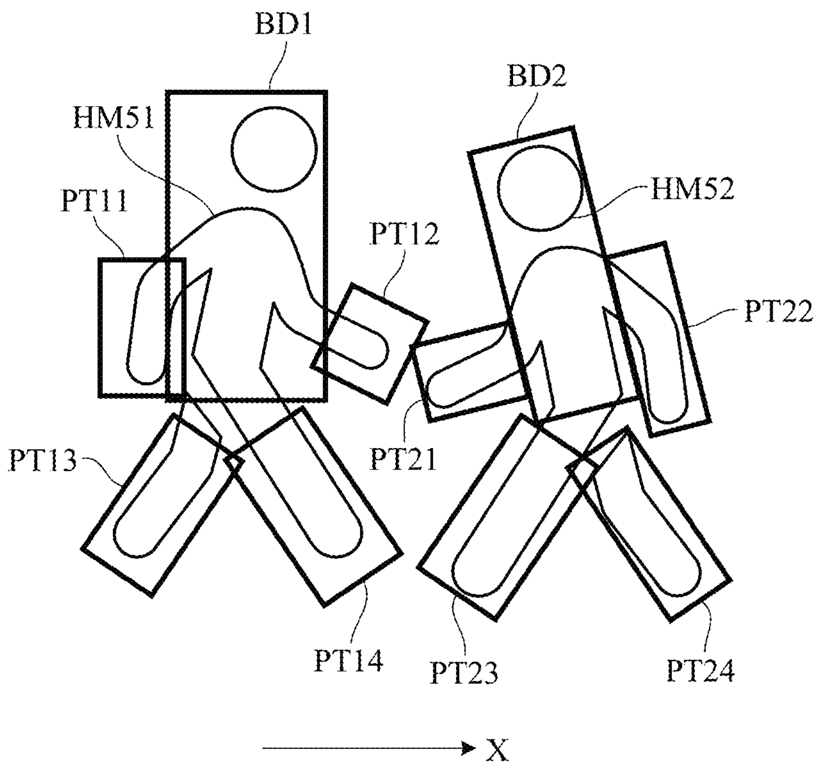
FIG. 5A is a diagram for describing a connection processing of the moving object.
Figure 5B:
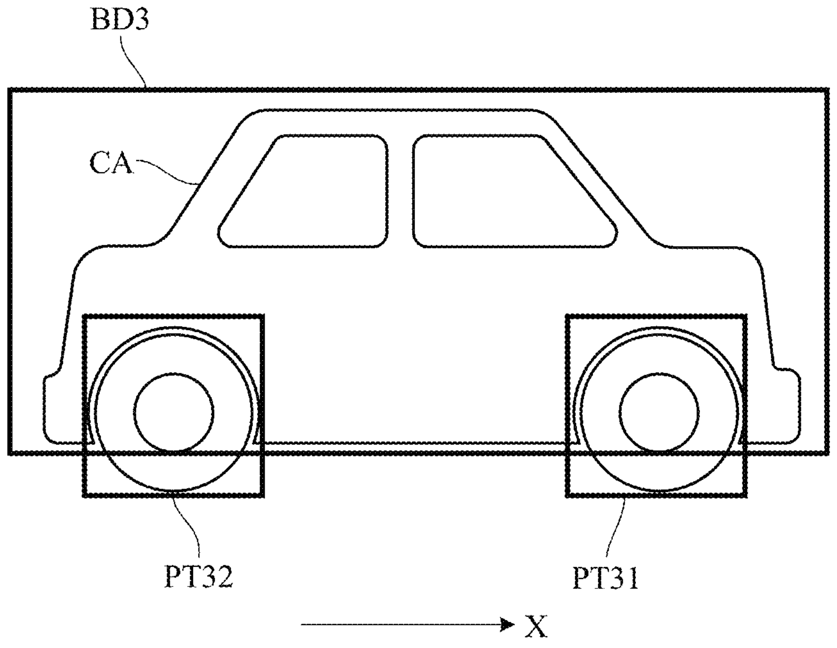
FIG. 5B is a diagram for describing a connection processing of the moving object.

FIGS. 5A and 5B are diagrams for describing the connection processing of the moving object. FIG. 5A is a schematic diagram of a pedestrian HM51 moving in an X direction and a pedestrian HM51 moving to face the pedestrian HM52, when viewed from a Y direction. In FIG. 5A, the bounding boxes that have been set in the clustering processing by the detection unit 117 are schematically illustrated respectively as square frames BD1, BD2, PT11 to PT14, and PT21 to PT24. The bounding boxes BD1 and BD2 respectively correspond to the torsos of the pedestrians HM51 and HM52. The bounding boxes PT11, PT12, PT21, and PT22 respectively correspond to arms of the pedestrians HM51 and HM52. The bounding boxes PT13, PT14, PT23, and PT24 respectively correspond to legs of the pedestrians HM51 and HM52.

The detection unit 117 determines whether there is a bounding box, the distance from which is shorter than a predetermined length to another bounding box having a size equal to or larger than a predetermined threshold, and which has its own size smaller than the predetermined threshold (hereinafter, referred to as a connecting target bounding box or simply as a connecting target box) among the bounding boxes that have been set in the clustering processing. Upon determination that a connecting target box is present, the detection unit 117 connects the connecting target box to the above other bounding box (hereinafter, referred to as a connected target bounding box or simply a connected target box). In the example of FIG. 5A, the bounding boxes PT11 to PT14 are selected as the connecting target boxes, and the bounding box BD1 is selected as the connected target box corresponding to the connecting target boxes PT11 to PT14. As a result, the bounding boxes PT11 to PT14 are connected to the bounding box BD1. Similarly, the bounding boxes PT21 to PT24 are connected to the bounding box BD2. This suppresses the detection of each of the torsos and the four limbs of the pedestrians HM51 and HM52 as separate moving objects. Note that the bounding boxes BD1 and BD2, each of which has a size equal to or larger than the predetermined threshold, are the connected target boxes. Therefore, they are not connected to each other, even though the distance between them is shorter than the predetermined length. In addition, PT11 to PT14 and PT21 to PT24, each of which has a size smaller than the predetermined threshold, are the connecting boxes. Therefore, they are not connected to each other, even though the distance between them is shorter than the predetermined length.

Note that in FIG. 5A, the torso and the four limbs of the pedestrian have been described as an example. However, also with regard to a vehicle traveling in the surroundings of the subject vehicle, the absolute moving speeds to be calculated by the calculation unit 113 are different between the main body of the vehicle and parts such as wheels attached to the main body, in some cases. FIG. 5B is a schematic diagram, when a vehicle CA moving in an X direction is viewed from a Y direction. In FIG. 5B, the bounding boxes that have been set in the clustering processing by the detection unit 117 are schematically illustrated as square frames BD3, PT31, and PT32. The bounding box BD3 corresponds to the main body of the vehicle CA. The bounding boxes PT31 and PT32 respectively correspond to the front wheel and the rear wheel of the vehicle CA. The main body of the vehicle CA and the parts such as wheels attached to the main body have the same moving speed in the advancing direction of the vehicle. However, the relative positions with respect to the LiDAR 5 are different from one another, and thus the calculation unit 113 calculates different relative moving speeds, in some cases. Also in such cases, by performing the above connection processing, it becomes possible to connect the bounding boxes PT31 and PT32 to the bounding box BD3. As a result, it becomes possible to suppress the detection of the main body and the parts of the vehicle CA as separate moving objects.

Figure 6:
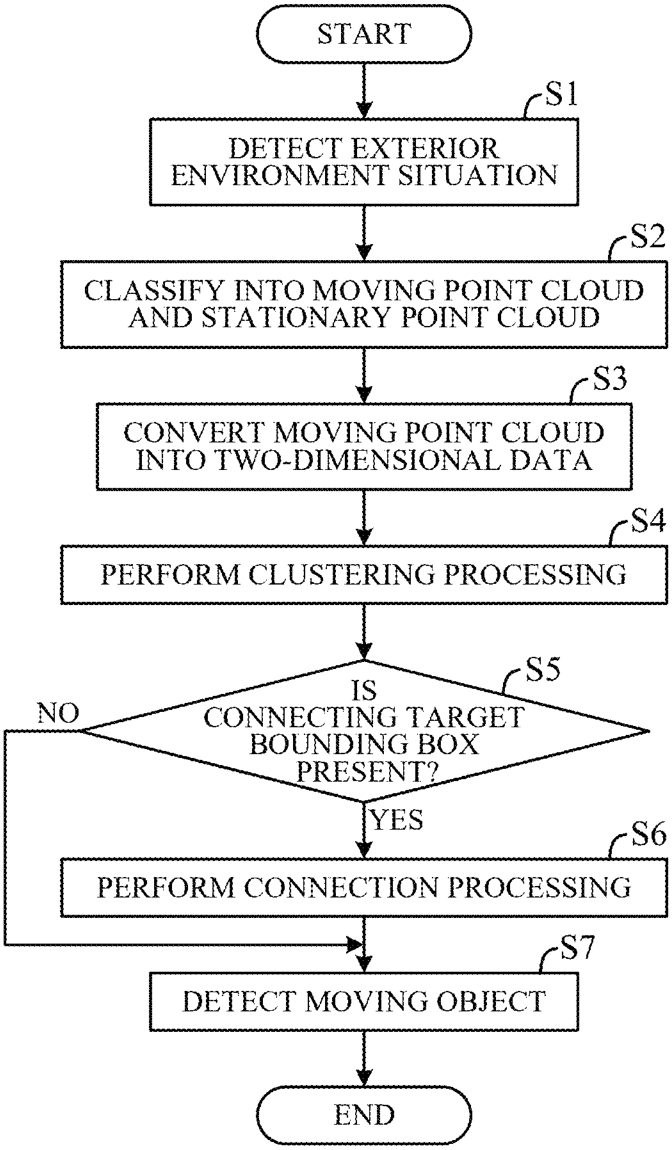
FIG. 6 is a flowchart illustrating an example of processing to be performed by of the controller in FIG. 1.

FIG. 6 is a flowchart illustrating an example of processing to be performed by the processing unit 11 of the controller 10 in FIG. 1 in accordance with a predetermined program. The processing illustrated in this flowchart is repeated at a predetermined cycle, while the object detection apparatus 50 is running. More specifically, the processing is repeated every cycle in accordance with the frame rate of the LiDAR 5.

First, in step S1, an exterior environment situation in the surroundings of the subject vehicle is detected. Specifically, an irradiation command is transmitted to the LiDAR 5, and point cloud data (detection data) including position information and speed information of a measurement point at which the reflected wave of the electromagnetic wave that has been irradiated from the LiDAR 5 is obtained in accordance with the irradiation command is acquired. In step S2, the point cloud data acquired in step S1 is classified into moving point cloud data and stationary point cloud data. More specifically, the point cloud data is classified into the moving point cloud data corresponding to the measurement point at which the absolute value of the absolute moving speed is equal to or higher than the predetermined speed Th_V and the stationary point cloud data corresponding to any other measurement point.

Next, the processing of steps S3 to S6 is performed on the moving point cloud data. Note that predetermined processing is also performed on the stationary point cloud data by the controller 10, but its description will be omitted.

In step S3, each measurement point corresponding to the moving point cloud data is projected on the XY plane, and the moving point cloud data is converted into two-dimensional data represented in an XY coordinate system. In step S4, the clustering processing is performed. Specifically, first, the absolute moving speed corresponding to each measurement point calculated in step S2 is added to each piece of the position information of each measurement point included in the moving point cloud data converted into the two-dimensional data in step S3, and three-dimensional data (XYV data) is generated. Next, the clustering processing is performed on the XYV data that has been generated.

In step S5, it is determined whether a connecting target box is present among the bounding boxes detected in the clustering processing in step S4. In a case where a negative determination is made in step S5, the processing proceeds to step S7. On the other hand, in a case where an affirmative determination is made in step S5, the connection processing of connecting the connecting target box to the connected target box corresponding to the connecting target box is performed in step S6, and then the processing proceeds to step S7. In step S7, the position and the size of the moving object in the surroundings of the subject vehicle in the three-dimensional space (XYZ space) are detected, based on the position and the size of the bounding box detected in the clustering processing in step S4. Note that in a case where the bounding boxes are connected in the connection processing of step S6, the position and the size of the moving object in the three-dimensional space are detected, based on the position and size of the bounding boxes after connection.

According to the embodiments described above, the following operations and effects are obtained.

(1) The object detection apparatus 50 includes: the LiDAR 5, which is mounted on a subject vehicle, which irradiates a three-dimensional space in the surroundings of the subject vehicle with an electromagnetic wave, and which detects an exterior environment situation in the surroundings of the subject vehicle, based on a reflected wave; the data acquisition unit 111, which acquires point cloud data including three-dimensional position information of a measurement point on a surface of an object from which the reflected wave is obtained and first speed information indicating a relative moving speed of the measurement point; the estimation unit 112, which serves as a speed acquisition unit that acquires second speed information indicating an absolute moving speed of the subject vehicle; the calculation unit 113, which calculates the absolute moving speed of each of a plurality of measurement points corresponding to the point cloud data, based on the first speed information and the second speed information; the classification unit 114, which classifies the point cloud data into moving point cloud data and stationary point cloud data other than the moving point cloud data, the moving point cloud data corresponding to a measurement point at which an absolute value of the absolute moving speed that has been calculated by the calculation unit 113 is equal to or higher than a predetermined speed Th_V; the conversion unit 115, which converts three-dimensional position information of each measurement point corresponding to the moving point cloud data into two-dimensional position information; the generation unit 116, which generates speed added data obtained by adding the absolute moving speed that has been calculated by the calculation unit 113 and that corresponds to each measurement point to the two-dimensional position information of each measurement point that has been obtained by conversion by the conversion unit 115; and the detection unit 117, which detects the object included in the three-dimensional space in the surroundings of the subject vehicle, based on the speed added data that has been generated by the generation unit 116. The conversion unit 115 projects each measurement point corresponding to the moving point cloud data on the XY plane, and converts three-dimensional position information of each measurement point into two-dimensional position information. The detection unit 117 performs the predetermined clustering processing on the speed added data, detects a circumscribed region of the object from the XY plane, and detects the position and the size of the above object in the three-dimensional space, based on the position and the size of the circumscribed region. This enables moving objects in close proximity to each other, such as pedestrians passing each other, to be detected as different moving objects. As a result, the detection accuracy of the moving object can be improved. In addition, the clustering processing is performed on the measurement point cloud corresponding to the moving object, so that the calculation load on the detection of the moving object can be reduced, as compared with a case where the clustering processing is performed including the measurement point cloud corresponding to the stationary object.

(2) Upon detection of a plurality of circumscribed regions respectively corresponding to a plurality of objects from the XY plane, in a case where a distance between a first circumscribed region having a size smaller than a predetermined threshold and a second circumscribed region having a size equal to or larger than the predetermined threshold is shorter than a predetermined length, the detection unit 117 connects the first circumscribed region to the second circumscribed region. The detection unit 117 detects the position and the size of a single object in the three-dimensional space in the surroundings of the subject vehicle, based on the position and the size of a connection region obtained by connecting the first circumscribed region to the second circumscribed region. More specifically, the detection unit 117 detects the position and the size of a third object (for example, the vehicle CA in FIG. 5B) including a first object and a second object in the three-dimensional space, based on the position and the size of the connection region obtained by connecting the first circumscribed region (for example, the bounding boxes PT31 and PT32 in FIG. 5B) corresponding to the first object (for example, a part attached to the vehicle body of the vehicle CA in FIG. 5B) with the second circumscribed region (for example, the bounding box BD3 in FIG. 5B) corresponding to the second object (for example, the vehicle body of the vehicle CA in FIG. 5B). This enables a moving object including a main body and parts, such as a torso and four limbs of a person or a main body and wheels of a vehicle, to be appropriately recognized as one moving object.

(3) The estimation unit 112 estimates the absolute moving speed of the subject vehicle, based on the position information and the speed information of a representative measurement point that has been extracted from the point cloud data acquired by the data acquisition unit 111, and acquires an estimation result as the speed information. The representative measurement point is selected from remaining measurement points excluding the measurement points corresponding to a three-dimensional object from the plurality of measurement points. Accordingly, the absolute moving speed of the subject vehicle is estimated with reference to the measurement point corresponding to the road surface. As a result, the absolute moving speed of the subject vehicle can be accurately estimated. In addition, the absolute moving speed of the subject vehicle (the mobile body) is estimated and acquired, regardless of a sensor value of a vehicle speed sensor or the like. Therefore, the present invention is applicable to a self-propelled robot or the like that does not include the vehicle speed sensor or the like.

The above embodiment can be modified into various forms. Hereinafter, modifications will be described. In the above embodiment, the LiDAR 5 as a detector is mounted on the vehicle, irradiates the three-dimensional space in the surroundings of the vehicle with the electromagnetic wave, and detects the exterior environment situation in the surroundings of the vehicle, based on the reflected wave. However, the detector may be a radar or the like, instead of the LiDAR. In addition, the mobile body in which the detector is mounted may be a self-propelled robot, instead of the vehicle.

Further, in the above embodiment, the conversion unit 115 converts the moving point cloud data that has been obtained by the classification unit 114 into two-dimensional data, the generation unit 116 adds the absolute moving speed that has been calculated by the calculation unit 113 to the moving point cloud data that has been changed into the two-dimensional data, and generates three-dimensional speed added data (XYV data), and the detection unit 117 performs the clustering processing on the XYV data, and detects a moving object in the surroundings of the subject vehicle. However, in a case where the accuracy of the cluster size in the three-dimensional space (XYZ space) is demanded, the above clustering processing may be performed on the XYZ space. Specifically, the generation unit may add the absolute moving speed that has been calculated by the calculation unit 113 to the moving point cloud data that has been obtained by the classification unit 114, and may generate four-dimensional speed added data (hereinafter, referred to as XYZV data). Then, the detection unit may perform the clustering processing on such XYZV data.

In addition, in the above embodiment, the estimation unit 112, which serves as the speed acquisition unit, selects the measurement point Pi as the representative measurement point from among the remaining measurement points excluding the measurement point corresponding to the three-dimensional object from the plurality of measurement points, estimates the absolute moving speed of the subject vehicle, based on the position information and the speed information of the representative measurement point that has been extracted from the point cloud data acquired by the data acquisition unit 111, and acquires an estimation result as the second speed information. However, the speed acquisition unit may acquire, as the second speed information, the measurement result of the absolute moving speed of the subject vehicle that has been acquired by a measuring instrument included in the internal sensor group 3. In this case, the object detection apparatus 50 includes at least a vehicle speed sensor of the internal sensor group 3, as the measuring instrument. In addition, the speed acquisition unit may calculate and acquire the absolute moving speed of the subject vehicle, based on the current position of the subject vehicle that has been measured by the position measurement unit 2. In this case, the object detection apparatus 50 includes the position measurement unit 2.

Further, in the above embodiment, the driving control unit 118 conducts the travel control of the subject vehicle to avoid collision or contact with the object that has been detected by the detection unit 117. However, the driving control unit 118, which serves as a notification unit, may predict a possibility of collision or contact with the moving object, based on the size, the position, and the moving speed of the moving object that has been detected by the detection unit 117. Then, in a case where the possibility of collision or contact with the moving object is equal to or higher than a predetermined degree, an occupant of the subject vehicle may be notified of information (video information or audio information) for calling for attention about collision or contact with the moving object that has been detected by the detection unit 117 via a display or a speaker, not illustrated, included in the vehicle control apparatus 100.

Furthermore, in the above embodiment, the object detection apparatus 50 is applied to a self-driving vehicle, but the object detection apparatus 50 is also applicable to vehicles other than self-driving vehicles. For example, the object detection apparatus 50 is also applicable to a manual driving vehicle including advanced driver-assistance systems (ADAS).

The above embodiment can be combined as desired with one or more of the above modifications. The modifications can also be combined with one another.

According to the present invention, it becomes possible to accurately detect a moving object, while reducing a calculation load.

Above, while the present invention has been described with reference to the preferred embodiments thereof, it will be understood, by those skilled in the art, that various changes and modifications may be made thereto without departing from the scope of the appended claims.

What is claimed is:

1. An object detection apparatus comprising:

a detector mounted on a mobile body, and configured to irradiate a three-dimensional space in a surrounding of the mobile body with an electromagnetic wave to detect an exterior environment situation in the surrounding of the mobile body based on a reflected wave; and a microprocessor, wherein the microprocessor is configured to perform:

acquiring from the detector, point cloud data including three-dimensional position information of a measurement point on a surface of an object from which the reflected wave is obtained and first speed information indicating a relative moving speed of the measurement point;

acquiring second speed information indicating an absolute moving speed of the mobile body;

calculating the absolute moving speed of each of a plurality of measurement points corresponding to the point cloud data, based on the first speed information and the second speed information;

classifying the point cloud data into moving point cloud data and stationary point cloud data other than the moving point cloud data, the moving point cloud data corresponding to measurement points where absolute values of the absolute moving speeds are equal to or higher than a predetermined speed;

converting the three-dimensional position information of each of measurement points corresponding to the moving point cloud data into two-dimensional position information;

generating speed added data by adding the absolute moving speed corresponding to each of the measurement points corresponding to the moving point cloud data to the two-dimensional position information of each of the measurement points; and detecting the object included in the three-dimensional space in the surroundings of the mobile body, based on the speed added data.

2. The object detection apparatus according to claim 1, wherein the microprocessor is configured to perform the converting including projecting each of the measurement points corresponding to the moving point cloud data on a plane to convert the three-dimensional position information of each of the measurement points into the two-dimensional position information, and the detecting including performing a predetermined clustering processing on the speed added data to detect a circumscribed region of the object from the plane, and detect a position and a size of the object in the three-dimensional space based on a position and a size of the circumscribed region.

3. The object detection apparatus according to claim 2, wherein the microprocessor is configured to perform the detecting including, upon detection of a plurality of circumscribed regions respectively corresponding to a plurality of objects from the plane, in a case where a distance between a first circumscribed region having the size smaller than a predetermined threshold and a second circumscribed region having the size equal to or larger than the predetermined threshold is shorter than a predetermined length, connecting the first circumscribed region to the second circumscribed region.

4. The object detection apparatus according to claim 3, wherein the microprocessor is configured to perform the detecting including detecting a position and a size of a single object in the three-dimensional space, based on a position and a size of a connection region obtained by connecting the first circumscribed region to the second circumscribed region.

5. The object detection apparatus according to claim 3, wherein the microprocessor is configured to perform the detecting including detecting a position and a size of a third object including a first object and a second object in the three-dimensional space, based on a position and a size of the connection region obtained by connecting the first circumscribed region corresponding to the first object with the second circumscribed region corresponding to the second object.

6. The object detection apparatus according to claim 1, wherein the microprocessor is configured to perform the acquiring the second speed information including estimating the absolute moving speed of the mobile body, based on the position information and the first speed information of a representative measurement point extracted from the point cloud data acquired by the detector, and acquiring a result of the estimating as the second speed information, and the representative measurement point is selected from remaining measurement points excluding measurement points corresponding to a three-dimensional object from the plurality of measurement points.

7. The object detection apparatus according to claim 1 further comprising a measuring instrument configured to measure the absolute moving speed of the mobile body, wherein the microprocessor is configured to perform the acquiring the second speed information including acquiring a measurement result of the measuring instrument as the second speed information.

8. The object detection apparatus according to claim 1, wherein the detector is a Lidar.

* * * * *